(12) United States Patent
Lue et al.

(10) Patent No.: US 6,870,010 B1
(45) Date of Patent: Mar. 22, 2005

(54) LOW HAZE HIGH STRENGTH POLYETHYLENE COMPOSITIONS

(75) Inventors: Ching-Tai Lue, Houston, TX (US); Tae Hoon Kwalk, Belle Mead, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 10/724,946

(22) Filed: Dec. 1, 2003

(51) Int. Cl.$^7$ .......................... C08L 23/06; C08L 23/08
(52) U.S. Cl. .................. 525/240; 526/348; 526/348.1; 526/352
(58) Field of Search ................ 525/240; 526/348, 526/352, 348.1

(56) References Cited

U.S. PATENT DOCUMENTS

| | | | |
|---|---|---|---|
| 4,438,238 A | * 3/1984 | Fukushima et al. | 525/240 |
| 5,110,685 A | 5/1992 | Cross et al. | 428/494 |
| 5,258,449 A | 11/1993 | Firdaus et al. | 524/579 |
| 5,338,589 A | 8/1994 | Böhm et al. | 428/36.9 |
| 5,378,764 A | 1/1995 | Benham et al. | 525/240 |
| 5,494,965 A | 2/1996 | Harlin et al. | 525/52 |
| 5,635,262 A | 6/1997 | Best et al. | 428/36.92 |
| 5,795,941 A | 8/1998 | Cree et al. | 525/240 |
| 6,090,893 A | 7/2000 | Harlin et al. | 525/240 |
| 6,147,174 A | 11/2000 | Holtcamp et al. | 526/160 |
| 6,207,606 B1 | 3/2001 | Lue et al. | 502/113 |
| 6,255,426 B1 | 7/2001 | Lue et al. | 526/348 |
| 6,339,134 B1 | 1/2002 | Crowther et al. | 526/128 |
| 6,388,017 B1 | 5/2002 | McDaniel et al. | 525/240 |
| 6,388,115 B1 | 5/2002 | Crowther et al. | 556/11 |
| 6,420,580 B1 | 7/2002 | Holtcamp et al. | 556/11 |
| 6,441,096 B1 | 8/2002 | Bäckman et al. | 525/240 |
| 6,476,166 B1 | 11/2002 | Holtcamp et al. | 526/160 |
| 6,476,171 B1 | 11/2002 | Lue et al. | 526/348 |
| 6,489,413 B1 | 12/2002 | Floyd et al. | 526/160 |
| 6,492,472 B2 | 12/2002 | Lue et al. | 526/114 |
| 6,562,905 B1 | 5/2003 | Nummila-Pakarimen et al. | 525/191 |
| 6,605,675 B2 | 8/2003 | Mawson et al. | 526/115 |
| 6,608,149 B2 | 8/2003 | Mawson et al. | 526/60 |
| 6,689,847 B2 | 2/2004 | Mawson et al. | 526/116 |
| 2002/0010077 A1 | 1/2002 | Lue et al. | 502/104 |
| 2002/0058766 A1 | 5/2002 | Crowther et al. | 526/160 |
| 2002/0058828 A1 | 5/2002 | Crowther et al. | 556/11 |
| 2002/0103310 A1 | 8/2002 | Szul et al. | 526/114 |
| 2002/0107342 A1 | 8/2002 | Mawson et al. | 526/129 |
| 2002/0156208 A1 | 10/2002 | Floyd et al. | 526/127 |
| 2002/0161141 A1 | 10/2002 | Mawson et al. | 526/113 |
| 2003/0008980 A1 | 1/2003 | Mawson et al. | 526/61 |
| 2003/0088038 A1 | 5/2003 | Vaughan et al. | 526/114 |
| 2003/0105251 A1 | 6/2003 | Crowther et al. | 526/127 |
| 2003/0171512 A1 | 9/2003 | Mawson et al. | 526/129 |
| 2003/0171513 A1 | 9/2003 | Mawson et al. | 526/129 |
| 2003/0229186 A1 | 12/2003 | Mawson et al. | 526/61 |

FOREIGN PATENT DOCUMENTS

| | | |
|---|---|---|
| WO | WO 94/22948 | 10/1994 |
| WO | WO 97/47682 | 12/1997 |

OTHER PUBLICATIONS

Cooke et al., ANTEC (1989) 22–27.*
D.L. Cooke and T. Tikuisis, "*Addition of Branched Molecules and High Molecular Weight Molecules to Improve Optical Properties of LLDPE Film*" ANTEC p. 22 (1989).
A.M. Sukhadia, "*The Effects of Molecular Structure, Rheology, Morphology and Orientation on Polyethylene Blown Film Properties*" ANTEC p. 160 (1998).
F.C. Stehling, C.S. Speed, and L. Westerman, "*Causes of Haze of Low–Density Polyethylene Blown Films*" Macromolecules, 14, 698, (1981).
A.M. Sukhadia, D.C. Rohlfing, M.B. Johnson, G.L. Wilkes, "*A Comprehensive Investigation of the Origins of Surface Roughness and Haze in Polyethylene Blown Films*" AJournal of Applied Polymer Science, 85, 2396–2411 (2002).
M.B. Johnson, G.L. Wilkes, A.M. Sukhadia, D.C. Rohlfing, "*Optical Properties of Blown and Cast Polyethylene Films: Surface Versus Bulk Structural Considerations*" Journal of Applied Polymer Science, 77, 2845–2864, (2002).
E. Andreassen and A. Larsen, "*Haze of Polyethylene Films—Effects of Material Parameters and Clarifying Agents*" Polymer Engineering and Science, 42, 5, 1082–1097 (2002).
A. Prasad, R. Shroff, S. Kane, G. Beaucage, "*Morphological study of HDPE blown films by SAXS, SEM and TEM: a relationship between the melt elasticity parameter and lamellae orientation*" Polymer, 42, 3103–3113 (2001).
ATOFINA Petrochemicals, "*Finathene® HMW–HDPE A blend Study of Finathene® HMW–HDPE And LLDPE Resins*" Atofina Film Technical Bulletin $2^{nd}$ in a Series.
Debra J. Houska and Steve A. Best, "*Blends of mLLDPE with MMW–HDPE for Films with Improved Property Stiffness Balance*" 1997 Polymers, Lamination, & Coatings Conference p. 633–638 (1997).

* cited by examiner

Primary Examiner—Roberto Rabago (57) ABSTRACT

A low density substantially linear polyethylene composition is described, including some that have: (a) a density of 0.935 g/cc or less; (b) a Haze of 10% or less, (c) a Dart Impact of 100 grams/mil or more, (d) an average overall long chain branching index of 0.95 or more; and (e) a slice long chain branching (SLCB) index of 0.85 or less for any portion of the composition having a molecular weight of 100,000 or above.

24 Claims, 1 Drawing Sheet

FIG. 1

LOW HAZE HIGH STRENGTH POLYETHYLENE COMPOSITIONS

BACKGROUND

1. Field of Inventions

This application relates to polyethylene compositions, preferably blended compositions that include two or more different polyethylene polymers. Preferably, each of the individual polymers has a different complexity of long chain branching. The blend composition is preferably substantially linear, while at least one of the individual polymers is preferably branched, e.g., having an average long chain branching index of 0.85 or less.

2. Description of Related Art

Others have made compositions that include polyethylene, and reported various properties of those compositions. The technical literature is replete with such information, including the following articles: D. L. Cooke and T. Tikuisis, Addition of Branched Molecules and HMW Molecules to Improve Optical Properties of LLDPE (ANTEC, p. 22 (1989)); A. M. Sukhadia, The effects of Molecular Structure, Rheology, Morphology and Orientation on PE blown film properties (ANTEC, p 160 (1998)); F. C. Stehling, C. S. Speed, and L. Westerman, *Macromolecules*, 14, 698, (1981); A. M. Sukhadia, D. C. Rohlfing, M. B. Johnson, G. L. Wilkes, *Journal of Applied Polymer Science*, 85, 2396–2411, (2002); M. B. Johnson, G. L. Wilkes, A. M. Sukhadia, D. C. Rohlfing, *Journal of Applied Polymer Science*, 77, 2845–2864, (2002); E. Andreassen, and A. Larsen, *Polymer Engineering and Science*, 42, 1082–1097, (2002); and A. Prasad, R. Shroff, S. Rane, G. Beaucage, *Polymer*, 42, 3103–3113, (2001). Patents discussing compositions that include polyethylene include U.S. Pat. Nos. 6,388,017 and 5,258,449.

Efforts to improve polyethylene compositions, particularly compositions for films, have included attempts to make polyethylene with good optical properties, such as haze, and strength properties, such as Dart Impact. At least one shortcoming of many polyethylene compositions is that improved haze levels at a given film stiffness tend to be accompanied by loss in Dart Impact and/or other strength properties. There is a need at this time for polyethylene compositions that have a particular combination of desirable properties and characteristics. Those compositions are described below.

SUMMARY

One or more specific embodiments are directed to a low density substantially linear polyethylene composition preferably having: (a) a density of 0.935 g/cc or less; (b) a Haze of 10% or less, (c) a Dart Impact of 100 grams/mil or more, (d) an average long chain branching index of 0.95 or more; and (e) a slice long chain branching index (SLCB) of 0.85 or less for any portion of the composition having a molecular weight of 100,000 or above.

One or more specific embodiments are directed to a low density substantially linear polyethylene composition preferably having: (a) a density of 0.935 g/cc or less; (b) a Haze of 10% or less, (c) a Dart Impact of 100 grams/mil or more; and (d) an average long chain branching index of 0.95 or more; wherein: (e) a first portion of molecules has a slice long chain branching index of more than 0.90, the first portion representing 95.0 wt % or more of the composition; and (f) a second portion of molecules has a slice long chain branching index of 0.90 or less, the second portion representing greater than 0.2 wt % and less than 5.0 wt % of the composition.

One or more specific embodiments are directed to a low density substantially linear polyethylene composition preferably having: (a) a density of 0.935 g/cc or less; (b) a Haze of 10% or less, (c) a Dart Impact of 100 grams/mil or more; and (d) an average long chain branching index of 0.95 or more; wherein: (e) the composition comprises a blend of a first polyethylene component and a second polyethylene component; (f) the second polyethylene component is present in an amount of greater than 0.1 wt % and less than 10 wt %; and (g) the average long chain branching index of the second polyethylene component is less than 0.85.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the pertinent art to make and use the inventions, when the information in this patent is combined with available information and technology.

Specific Embodiments

One or more specific embodiments are directed to a low density substantially linear polyethylene composition preferably having: (a) a density of 0.935 g/cc or less; (b) a Haze of 10% or less, (c) a Dart Impact of 100 grams/mil or more, (d) an average long chain branching index of 0.95 or more; and (e) a slice long chain branching index of 0.85 or less for any portion of the composition having a molecular weight of 100,000 or above.

Figure 1:
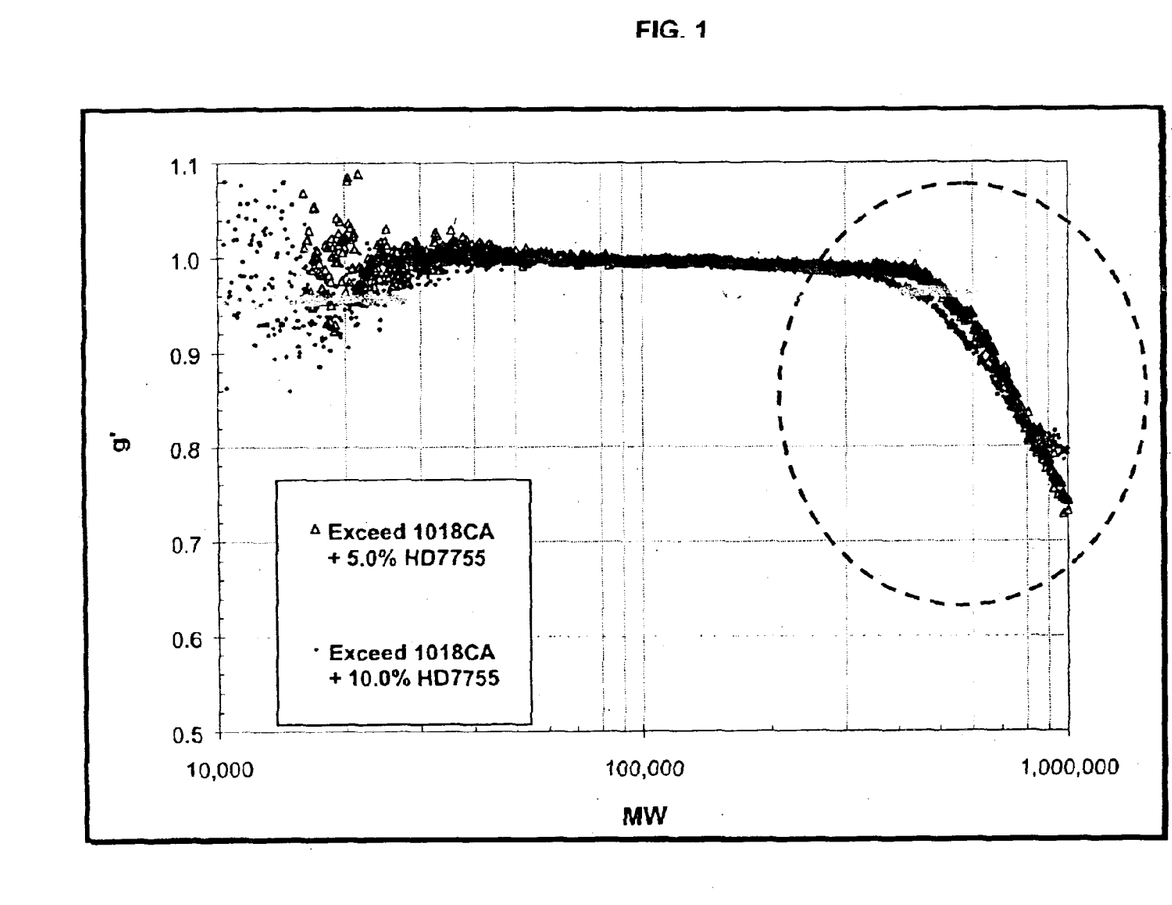
FIG. 1 shows a plot of SLCB index versus molecular weight for two different blend compositions.

Alternatively, the slice long chain branching index (also referred to as the SLCB index) can be 0.80 or less for any portion of the composition having a molecular weight of 100,000 or above. Alternatively, a composition may have a slice long chain branching (SLCB) index of 0.75 or less, or 0.70 or less, or 0.65 or less, or 0.60 or less, for any portion of the composition having a molecular weight of 100,000 or above. For example, as seen in FIG. 1, the plotted curves based on actual data demonstrate a pronounced nosedive in the plotted SLCB index along the x-axis, which represents molecular weight. Certain properties of the composition have been observed to relate to the nosedive, as discussed below.

In one or more alternative embodiments, the molecular weight ranges corresponding to the any one of the aforementioned slice long chain branching indexes can be (instead of 100,000 or above) 150,000 or above; or 200,000 or above; or 250,000 or above; or 300,000 or above; or 350,000 or above; or 400,000 or above.

In one or more alternative embodiments, a composition can have a portion represented by any of the above-listed molecular weight ranges (e.g., ranging from the broad range of 100,000 or above to a more narrow range of 400,000 or above), and for that portion the slice long chain branching index can be any of the above listed values (e.g., ranging from 0.85 or less to 0.60 or less). In addition (or alternatively), such portion can occupy a particular amount, e.g., weight percent. For example, such portion can occupy 5 percent by weight (5 wt %) or less of the composition, or a lesser amount, e.g., 4.5 wt % or less; 4.0 wt % or less; 3.5 wt % or less; 3.0 wt % or less; 2.5 wt % or less; 2.0 wt % or less; 1.5 wt % or less; 1.0 wt % or less; or 0.5 wt % or less.

One or more specific embodiments can involve a low density substantially linear polyethylene composition having: (a) a density of 0.935 g/cc or less; (b) a Haze of 10% or less, (c) a Dart Impact of 100 grams or more; and (d) an average long chain branching index of 0.95 or more; wherein: (e) a first portion of molecules has a slice long chain branching index of more than 0.90, the first portion representing 95.0 wt % or more of the composition; and (f) a second portion of molecules has a slice long chain branching index of 0.90 or less, the second portion representing 5.0 wt % or less of the composition.

In alternative embodiments of the composition described above (or elsewhere herein) the second portion can represent 4.5 wt % or less of the composition; or 4.0 wt % or less; or 3.5 wt % or less; or 3.0 wt % or less; or 2.5 wt % or less; or 2.0 wt % or less; or 1.5 wt % or less; or 1.0 wt % or less; or 0.5 wt % or less. But in such embodiments the second portion should represent at least 0.2 wt % of the composition.

In other alternative embodiments of the composition described above (or elsewhere herein) the second portion of molecules can be present in any of the amounts listed above e.g., ranging from 5.0 wt % down to 0.2 wt %, and have a slice long chain branching index of 0.85 or less; or 0.80 or less; or 0.75 or less; or 0.70 or less; or 0.65 or less; or 0.60 or less.

One or more specific embodiments can involve a low density substantially linear polyethylene composition having: (a) a density of 0.935 g/cc or less; (b) a Haze of 10% or less, (c) a Dart Impact of 100 grams or more; and (d) an average long chain branching index of 0.95 or more; wherein: (e) the composition comprises a blend of a first polyethylene component and a second polyethylene component; (f) the second polyethylene component is present in an amount of less than 10 wt %, but at least 0.1 wt % and (g) the average long chain branching index of the second polyethylene component is less than 0.85.

In alternative embodiments of the composition described above (or elsewhere herein), the second polyethylene component can be (or include, or consist of, or consist essentially of) a polyethylene that occupies 5 wt % or less of the composition, or less than 5 wt % of the composition; or smaller amounts, such as 4.5 wt % or less of the composition, or 4.0 wt % or less; or 3.5 wt % or less; or 3.0 wt % or less; or 2.5 wt % or less; or 2.0 wt % or less; or 1.5 wt % or less; or 1.0 wt % or less or 0.5 wt % or less. As discussed elsewhere herein, the second polyethylene preferably has a particular range of physical and chemical characteristics, e.g., densities and long chain branching characteristics, and the resulting composition blend that incorporates the second polyethylene also has a preferred range of physical and chemical characteristics, which in certain embodiments include a preferred range of Haze and/or Dart Impact levels.

In alternative embodiments of the composition described above (or elsewhere herein), the second polyethylene component includes (or is, or consists of, or consists essentially of) a high density polyethylene (HDPE) having a density of 0.945 g/cc or more. Examples of HDPE resins are identified below in the Examples.

In alternative embodiments, the second polyethylene component includes (or is, or consists or, or consists essentially of) a high pressure linear low density polyethylene (HP-LDPE) having a density of 0.935 g/cc or less. Examples of HP-LDPE are identified below in the Examples.

As reflected in the examples, it was surprisingly discovered that a composition with a high density second polyethylene component had better properties than a composition with comparable amounts of low density second polyethylene component made from a high pressure polymerization process, such as the high pressure process described as "HP-LDPE." See, for example, John Brydson, "Plastics Materials", $7^{th}$ Ed., Chpt. 10, 1999, Butterworth Heinemann.

In alternative embodiments of the composition described above (or elsewhere herein), the first polyethylene component includes (or is, or consists of, or consists essentially of) a polyethylene with an average long chain branching index of 0.95 or more; or 0.96 or more; or 0.97 or more. An example of a first polyethylene component is Exceeds 1018, available from ExxonMobil Chemical Co.

In alternative embodiments of the composition described above (or elsewhere herein), the second polyethylene component includes (or is, or consists of, or consists essentially of) a polyethylene with an average long chain branching index of 0.88 or less; or 0.85 or less; or 0.83 or less; or 0.80 or less; or 0.75 or less; or 0.70 or less; or 0.65 or less; or 0.60 or less.

In alternative embodiments of the composition described above (or elsewhere herein), the polydispersity index (PDI) of the first polyethylene component is from 2 to 7.

In alternative embodiments of the composition described above (or elsewhere herein), the polydispersity index (PDI) of the second polyethylene component is from 5 to 25, or from 7 to 15.

In one or more embodiments, the density of any or all of the compositions described above (or elsewhere herein), may range from 0.910 to 0.935 g/cc.

The average long chain branching index of any or all of the compositions described above or elsewhere herein, particularly the compositions that are blends of two or more different polyethylene resins, can be 0.95 or more, or 0.96 or more, or 0.97 or more. Any blended composition having an average LCB index (g') less than 0.95 is undesirable for purposes herein.

The Haze of any or all of the compositions described above (or elsewhere herein) is preferably 10% or less. Alternatively, The Haze of the compositions described herein can be within ranges that have 2, 3, 4 or 5% as lower limits and 3, 4, 5, 6, 7, 8, 9 and 10% as upper limits. Thus, the broadest preferred range of Haze is from 2% to 10%, and a more narrow preferred range is 5% and below, or even 3% and below.

The Dart Impact of any or all of the compositions described above (or elsewhere herein) is preferably 150 grams/mil or more, or even higher, e.g., 200 grams/mil or more; 250 grams/mil or more; 300 grams/mil or more; 350 grams/mil or more; 400 grams/mil or more; 450 grams/mil or more; or 500 grams/mil or more. In one or more embodiments, a correlation has been observed between the density of a particular composition and its Dart Impact. That is, Dart Impacts for certain compositions described herein are equal to a constant C multiplied by Density$^{-144.83}$, wherein the constant C can be 0.00196 or more; or 0.00224 or more; or 0.00252 or more; or 0.0028 or more; and wherein Density is expressed in units of g/cc and Dart Impact is expressed in units of grams/mil.

The polydispersity (PD) of any or all of the compositions described above (or elsewhere herein) is preferably from 2 to 7.

The Elmendorf Tear (MD) of any or all of the compositions described above (or elsewhere herein) is preferably 100 grams/mil or more. Alternatively, the Elmendorf Tear (MD) is 150 grams/mil or more. Preferably, the Elmendorf Tear (MD) is 175 grams/mil or more. Examples of Elmendorf Tear (MD) ranges are those having no upper limits, with lower limits of 100, 110, 120, 140, 160, 180, 200, 210, 220, 240, 260, 280, 300, 320, 340, 360, 380, 400, 420, 440, 460, 480, or 500, (all in grams/mil). For example, based on the foregoing list, a specific embodiment of the composition has an Elmendorf Tear (MD) of 500 grams/mil or more.

The Elmendorf Tear (TD) of any or all of the compositions described above (or elsewhere herein) is preferably 100 grams/mil or more. Alternatively, the Elmendorf Tear (TD) is 150 grams/mil or more. Preferably, the Elmendorf Tear (TD) is 175 grams/mil or more. Examples of Elmendorf Tear (TD) ranges are those having no upper limits, with lower limits of 100, 110, 120, 140, 160, 180, 200, 210, 220, 240, 260, 280, 300, 320, 340, 360, 380, 400, 420, 440, 460, 480, 500, 520, 540, 560, 580, 600, 620, 640, 660, 680, 700, 720, 740, 760, 780, or 800 (all in grams/mil). For example, based on the foregoing list, a specific embodiment of the composition has an Elmendorf Tear (TD) of 800 grams/mil or more.

Another physical property is Tensile Strength (MD). The Tensile Strength (MD) of any or all of the compositions described above (or elsewhere herein) is preferably 8500 psi or more. Alternatively, the Tensile Strength (MD) is 9500 psi or more. Preferably, the Tensile Strength (MD) is 10500 psi or more. Examples of Tensile Strength (MD) ranges are those with no upper limits and lower limits of 8000, 9000, 10000, 11000, or 12000 psi.

A related physical property is Tensile Strength (TD). The Tensile Strength (TD) of any or all of the compositions described above (or elsewhere herein) is preferably 5000 psi or more. Alternatively, the Tensile Strength (TD) is 7000 psi or more. Preferably, the Tensile Strength (TD) is 8000 psi or more. Examples of Tensile Strength (TD) ranges are those with no upper limits and lower limits of 6500, 7500, 8500, 9500, or 10500 psi.

In alternative embodiments of the composition described above (or elsewhere herein) the first and second (or more) polyethylene components can each be prepared in separate reactors and then blended after each polymerization is completed, to form the blended composition. In other embodiments, a composition can be prepared in which different components are blended in-situ (sometimes called reactor blending). In one or more embodiments, compositions are prepared in two reactors, e.g., using in-series reactors, or in single reactors, which may include the use of using two or more catalysts, e.g., a bimetallic catalyst.

Definitions and Properties

Various terms as used herein are defined below. To the extent a term used in a claim is not defined below, or elsewhere herein, it should be given the broadest definition persons in the pertinent art have given that term as reflected in printed publications and issued patents.

For purposes of convenience, various specific test procedures are identified for determining properties such as molecular weight, density, haze, etc. However, when a person of ordinary skill reads this patent and wishes to determine whether a composition or polymer has a particular property identified in a claim, e.g., density or long chain branching index or molecular weight, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Except to the extent the actual density is specified, the term "low density" means any density less than 0.940 g/cc, preferably less than 0.935 g/cc, and most preferably from 0.910 g/cc to 0.935 g/cc.

Except to the extent the actual density is specified, the term "high density" means any density of 0.940 g/cc or above, preferably 0.950 g/cc or above, more preferably 0.960 g/cc or above, and most preferably from 0.945 g/cc to 0.967 g/cc.

Preferably, each of the individual polymers has a different complexity of long chain branching, and the blend composition is preferably substantially linear, yet slightly branched, while at least one of the individual polymers is branched, preferably having an average index of 0.85 or less. The term "substantially linear" refers to any polymer or composition having an average long chain branching index of at least 0.95 or more, based on measured data, and thus may have long chain branching to some extent. In contrast, a polymer described as "linear" is one having no detectable long chain branching (quantitatively or qualitatively), preferably having a long chain branching index of 1.0 (+/−0.02).

The term "branched" means that the polymer or composition identified as branched has some degree of long chain branching (detected quantitatively or qualitatively), and preferably has a long chain branching index, based on measured data, of less than 1.0 (+/−0.02). The term "branched" as used herein does not refer to short chain branching, although it will be recognized that a material with long chain branching may also have short chain branching. The term "short chain branching" should be given its broadest definition as used in patents and printed publications.

The term "polyethylene" means a polymer made of at least 50% ethylene-derived units, preferably at least 70% ethylene-derived units, more preferably at least 80% ethylene-derived units, or 90% ethylene-derived units, or 95% ethylene-derived units, or even 100% ethylene-derived units. The polyethylene can thus be a homopolymer or a copolymer, including a terpolymer, having other monomeric units. A polyethylene described herein may, for example, include units derived from a co-monomer that is preferably an α-olefin, e.g., propylene, 1-butene, 1-pentene, 1-hexene, or 1-octene. Other embodiments may include ethacrylate or methacrylate.

Density is a physical property of a composition, is determined in accordance with ASTM-D-1505, and is expressed as grams per cubic centimeter (or grams per milliliter).

Haze is an optical property of a composition, or a polymer, or a film made of the particular polymer or composition being characterized, is determined in accordance with ASTM-D-1003, and is expressed as a percent (%).

Dart Impact is a mechanical/physical property of a composition, or a polymer, or a film made of the particular polymer or composition being characterized, and is determined in accordance with ASTM D-1709 (26 inches) and is expressed herein in terms of grams per mil or simply "grams," which as used herein is shorthand to mean grams per mil unless stated otherwise.

The Elmendorf Tear (MD) and Elmondorf Tear (TD) values refer to properties of a composition, or a polymer, or a film made of the polymer or composition being measured, and are measured according to ASTM D-1922-03. (The MD values refer to the machine direction while the TD values refer to the transverse direction.)

The Tensile Strength (MD) and Tensile Strength (TD) refer to properties of a composition, or a polymer, or a film made of the polymer or composition being measured, and are measured according to ASTM D-882.

To determine whether a particular composition meets any of the aforementioned optical and physical/mechanical properties in the claims, e.g., Haze, Dart Impact, Elmendorf Tear or Tensile Strength, the composition is to be formed into a film in accordance with the procedures, conditions and equipment corresponding to the First Blend Study of Table 1.

Molecular weight distribution (MWD) is characterized herein using Size-Exclusion Chromatography (SEC). Molecular weight, including weight-average molecular weight (Mw) and number-average molecular weight (Mn), are determined using a High Temperature Size Exclusion (SEC) Chromatograph (either from Waters Corporation or Polymer Laboratories), equipped with a differential refractive index detector (DRI), an online light scattering detector, and a viscometer. Experimental details not described below, including how the detectors may be calibrated, are described in: T. Sun, P. Brant, R. R. Chance, and W. W. Graessley, Macromolecules, Volume 34, Number 19, 6812–6820, (2001).

Three Polymer Laboratories PLgel 10 mm Mixed-B columns should be used. The nominal flow rate should be 0.5. $Cm^3$/min, and the nominal injection volume should be 300 microliters. The various transfer lines, columns and differential refractometer (the DRI detector) are contained in an oven maintained at 135° C.

Solvent for the SEC experiment (described in the examples) was prepared by dissolving 6 grams of butylated hydroxy toluene as an antioxidant in 4 liters of Aldrich reagent grade 1,2,4-trichlorobenzene (TCB). The TCB mixture was then filtered through a 0.7 micrometers glass pre-filter and subsequently through a 0.1 micrometers Teflon filter. The TCB was then degassed with an online degasser before entering the SEC.

Polymer solutions should be prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector should be purged. Flow rate in the apparatus should then be increased to 0.5 ml/minute, and the DRI be allowed to stabilize for 8–9 hours before injecting the first sample. The LS laser should be turned on 1 to 1.5 hours before running samples by running the laser in idle mode for 20–30 minutes and then switching to full power in light regulation mode. Depending on the specific instrument used, data can be collected at a rate of 0.5 to 4.0 seconds for each "slice" (point.)

The concentration, c, at each point in the chromatogram should be calculated from the DRI output, i.e., the baseline-subtracted DRI signal, $I_{DRI}$, using the following Equation 1:

$$c = K_{DRI} I_{DRI}/(dn/dc) \qquad \text{Equation 1}$$

where $K_{DRI}$ is a constant determined by calibrating the DRI, and (dn/dc) is the same as described below for the LS analysis. Units on parameters throughout this description of the SEC method are such that concentration is expressed in $g/cm^3$, molecular weight is expressed in g/mole, and intrinsic viscosity is expressed in dL/g.

The light scattering detector used should be either a Wyatt Technology High Temperature mini-DAWN or a Precision Detector 2040 LALLS. The data can be analyzed with the standard formula for static light scattering, i.e. Equation 2:

$$\frac{K_o c}{\Delta R(\theta,c)} = \frac{1}{MP(\theta)} + 2A_2 c \qquad \text{Equation 2:}$$

where $\Delta R(\theta,c)$ is the excess Rayleigh scattering intensity at scattering angle $\theta$, c is the polymer concentration, M is the polymer molecular weight, $A_2$ is the second virial coefficient of the solution, $P(\theta)$ is the form factor, and $K_o$ is the optical constant for the system:

$$K_o = \frac{4\pi^2 n^2 (dn/dc)^2}{\lambda^4 N_A} \qquad \text{Equation 3:}$$

in which $N_A$ is Avogadro's number, and dn/dc is the refractive index increment for the system. For the LALLS detector the scattering intensity is preferably measured at 15° and $P(\theta)=1$ is assumed. The concentrations used in the analyses should be the values obtained from the DRI output. The refractive index n for TCB at 135° C. for a 690 nm wavelength is 1.500. The value $A_2=0.0015$ mole·ml/$gm^2$ is used for ethylene-hexene and ethylene-butene polymers with less than 15 weight % comonomer. The value (dn/dc)= 0.104 is used for polyethylene and ethylene-hexene copolymers and the value (dn/dc)=0.104×(1−0.126 w) is used for ethylene-butene copolymers where w is the weight fraction of butane-derived units.

The viscometer that should be used is a Viscotek Corporation high temperature viscometer that has four capillaries arranged in a Wheatstone bridge configuration with two pressure transducers. The first transducer should measure the total pressure drop across the detector, and the other transducer, positioned between the two sides of the bridge, should be used to measure a differential pressure. The specific viscosity, $\eta_s$, for the solution flowing through the viscometer is calculated from their outputs. The intrinsic viscosity, $[\eta]$, at each point in the chromatogram is calculated from the following equation, where c was determined from the DRI output:

$$\eta_s = c[\eta] + 0.3(c[\eta])^2 \qquad \text{Equation 4}$$

The terms "long chain branching index" and "average long chain branching index" and "slice long chain branching index" each refer to values based on measured data. Various procedures have been published, and either are or will be available to identify whether a polymer has long chain branching or not, and a polymer is in general regarded herein as being "branched" to the extent long chain branching can be detected, regardless of the method or equipment used for such detection. Thus, in certain embodiments, a substantially linear polyethylene is branched to some degree.

Preferably, the polyethylenes described herein are branched to a degree that can be measured quantitatively, and even more preferably expressed in terms of a branching index as described below.

Two branching indices are preferably involved. The first is the average long chain brancing (LCB) index, also called $<g'>_{avg}$. The term "average long chain branching index" (or value) as used herein refers to the average long chain branching index (or value) of a sample of an entire composition, either a blended composition or an individual polymer. Thus it describes more than one fraction (or slice), and preferably all fractions or slices of that particular composition, e.g., all molecular weight fractions. Such "entire composition" may include more than one different polyethylene resin and preferably includes at least two polyethylene resins blended together to form a single composition. The average LCB index is calculated using the output of the method described above, as follows. The average intrinsic viscosity, $[\eta]_{avg}$, of the sample is calculated by:

$$[\eta]_{avg} = \frac{\sum c_i [\eta]_i}{\sum c_i} \qquad \text{Equation 5:}$$

where the summations are over the chromotographic slices, i, between the integration limits. The branching index $<g'>_{avg}$ is defined as:

$$<g'>_{avg} = \frac{\sum_{i=1}^{N} C_i \times [\eta]_i}{\sum_{i=1}^{N} C_i \times [k \times M_i^\alpha]} \qquad \text{Equation 6:}$$

where $C_i$ is the polymer concentration measured by the DRI at retention volume slice i, $M_i$ is the molecular weight determined by light scattering analysis at retention volume slice i, and $[\eta]_i$ is the intrinsic viscosity determined by viscometry analysis at slice i. The equation above can also be expressed as:

$$<g'>_{avg} = \frac{[\eta]_{avg}}{kM_v^\alpha} \qquad \text{Equation 7:}$$

The constants k and α are the Mark Houwink coefficients for a linear polymer of the same chemical composition. Here α is 0.695 and k is given by $$k(5.79 \times 10-4) \times (1 + C_{v,1}w + C_{v,2}w^2) \qquad \text{Equation 8}$$

where w is the weight fraction of comonomer. Here, $C_{v,1}$ and $C_{v,2}$ are −0.87 and 0.18 respectively for ethylene-butene copolymers and −0.75 and 0.00 respectively for ethylene-hexene copolymers. $M_v$ is the viscosity-average molecular weight based on molecular weights determined by LS analysis.

The second branching index is referred to herein as the slice long chain branching (SLCB) index, also called $g'_i$, and is defined as:

$$g'_i = \frac{[\eta]_i}{kM_i^\alpha} \qquad \text{Equation 9:}$$

Here the index "i" refers to a given retention volume slice. The values $[\alpha]$ and $M_i$ are, respectively, the intrinsic viscosity (determined by viscometry) and molecular weight (determined by light scattering analysis) at that retention volume slice respectively. The Mark Houwink coefficients k and α are as described above.

As discussed above, the portion of a composition having a particular molecular weight range, or portion thereof, or having a particular SLBC index, or range thereof, can be expressed in terms of weight percent. As used herein, the weight percent is determined by procedures that include normalizing the DRI output to one hundred, and then calculating the weight percent that elutes within a region of retention volume corresponding to the portion of interest. The weight percent should be equal to one hundred at zero retention volume and zero after the polymer composition has fully eluted.

In various embodiments described herein, highly complex long chain branching was observed for a particular portion of the composition that can be characterized in alternative molecular weight fractions that are actually ranges, e.g., low SLCB values for molecular weights of 100,000 or more, or of 150,000 or more, etc. It is recognized that different procedures may result in slightly different molecular weight measurements, and even that the same procedure may yield different molecular weight measurements; thus a person of ordinary skill in the art is to expect experimental variations. The equipment and procedures for measuring molecular weights and molecular weight distributions are described above.

The term "portion" when used to describe molecules means a subset of the polymer (e.g., polyethylene) molecules found in a particular composition, including but not limited to a percentage of the composition (expressed in weight percent) or a molecular weight range.

All weight percents expressed herein are obtained by SEC methodology as described above.

The polydispersity index (PDI) is also referred to as molecular weight distribution (MWD), and generally refers to the ratio of the weight average molecular weight (Mw) to the number average molecular weight (Mn).

The Melt Index (MI) sometimes referred to as 12 is measured according to ASTM D-1238, Condition 190/2.16; and $I_{21}$ is measured according to ASTM D-1238, Condition 190/21.6.

Polymerization Processes

The polymerization process used to form any of the polymers described herein, e.g., either of the polyethylene components used to make the blends, may be carried out using any suitable process, for example, high pressure, solution, slurry and gas phase. Certain polyethylenes can be made using a gas phase polymerization process, e.g., utilizing a fluidized bed reactor. This type reactor and means for operating the reactor are well known and completely described in, for example, U.S. Pat. Nos. 3,709,853; 4,003, 712; 4,011,382; 4,302,566; 4,543,399; 4,882,400; 5,352, 749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

A polymerization process may be effected as a continuous gas phase process such as a fluid bed process. A fluid bed reactor may comprise a reaction zone and a so-called velocity reduction zone. The reaction zone may comprise a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The reactor temperature of the fluid bed process herein preferably ranges from 30° C. or 40° C. or 50° C. to 90° C. or 100° C. or 110° C. or 120° C. or 150° C. In general, the reactor temperature is operated at the highest temperature that is feasible taking into account the sintering temperature of the polymer product within the reactor. Regardless of the process used to make the polyolefins of the invention, the polymerization temperature, or reaction temperature should be below the melting or "sintering" temperature of the polymer to be formed. Thus, the upper temperature limit in one embodiment is the melting temperature of the polyolefin produced in the reactor.

A slurry polymerization process can also be used. A slurry polymerization process generally uses pressures in the range of from 1 to 50 atmospheres and even greater and temperatures in the range of 0° C. to 120° C., and more particularly from 30° C. to 100° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, a branched alkane in one embodiment. The medium employed should be liquid under the conditions of polymerization and relatively inert. When a propane medium is used the process must be operated above the reaction diluent critical temperature and pressure. In one embodiment, a hexane, isopentane or isobutane medium is employed.

Also useful is particle form polymerization, a process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 2 Metallocene-Based Polyolefins 322–332 (2000).

These processes can be used for the production of homopolymers of olefins, particularly ethylene, and/or copolymers, terpolymers, and the like, of olefins, particularly ethylene, and at least one or more other olefin(s). Preferably the olefins are α-olefins. The olefins, for example, may contain from 2 to 16 carbon atoms in one embodiment; and in another embodiment, ethylene and a comonomer comprising from 3 to 12 carbon atoms in another embodiment; and ethylene and a comonomer comprising from 4 to 10 carbon atoms in yet another embodiment; and ethylene and a comonomer comprising from 4 to 8 carbon atoms in yet another embodiment. Particularly preferred are polyethylenes. Such polyethylenes are preferably homopolymers of ethylene and interpolymers of ethylene and at least one α-olefin wherein the ethylene content is at least about 50% by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the production of polyethylene or polypropylene, comonomers may be present in the polymerization reactor. When present, the comonomer may be present at any level with the ethylene or propylene monomer that will achieve the desired weight percent incorporation of the comonomer into the finished resin. In one embodiment of polyethylene production, the comonomer is present with ethylene in a mole ratio range of from 0.0001 (comonomer:ethylene) to 50, and from 0.0001 to 5 in another embodiment, and from 0.0005 to 1.0 in yet another embodiment, and from 0.001 to 0.5 in yet another embodiment. Expressed in absolute terms, in making polyethylene, the amount of ethylene present in the polymerization reactor may range to up to 1000 atmospheres pressure in one embodiment, and up to 500 atmospheres pressure in another embodiment, and up to 200 atmospheres pressure in yet another embodiment, and up to 100 atmospheres in yet another embodiment, and up to 50 atmospheres in yet another embodiment.

Hydrogen gas is often used in olefin polymerization to control the final properties of the polyolefin, such as described in Polypropylene Handbook 76–78 (Hanser Publishers, 1996). Using certain catalyst systems, increasing concentrations (partial pressures) of hydrogen can increase the melt flow rate (MFR) (also referred to herein as melt index (MD) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propene. The amount of hydrogen used in the polymerization process of the present invention is an amount necessary to achieve the desired MFR or MI of the final polyolefin resin. In one embodiment, the mole ratio of hydrogen to total monomer ($H_2$:monomer) is in a range of from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range may comprise any combination of any upper mole ratio limit with any lower mole ratio limit described herein. Expressed another way, the amount of hydrogen in the reactor at any time may range to up to 5000 ppm, and up to 4000 ppm in another embodiment, and up to 3000 ppm in yet another embodiment, and between 50 ppm and 5000 ppm in yet another embodiment, and between 500 ppm and 2000 ppm in another embodiment.

Further, it is common to use a staged reactor employing two or more reactors in series, wherein one reactor may produce, for example, a high molecular weight component and another reactor may produce a low molecular weight component. In one embodiment of the invention, the polyolefin is produced using a staged gas phase reactor. Such commercial polymerization systems are described in, for example, 2 Metallocene-Based Polyolefins 366–378 (John Scheirs & W. Kaminsky, eds. John Wiley & Sons, Ltd. 2000); U.S. Pat. No. 5,665,818, U.S. Pat. No. 5,677,375; U.S. Pat. No. 6,472,484; EP 0 517 868 and EP-A-0 794 200.

The one or more reactor pressures in a gas phase process (either single stage or two or more stages) may vary from 100 psig (690 kPa) to 500 psig (3448 kPa), and in the range of from 200 psig (1379 kPa) to 400 psig (2759 kPa) in another embodiment, and in the range of from 250 psig (1724 kPa) to 350 psig (2414 kPa) in yet another embodiment.

The gas phase reactor employing the catalyst system described herein is capable of producing from 500 lbs of polymer per hour (227 Kg/hr) to 200,000 lbs/hr (90,900 Kg/hr), and greater than 1000 lbs/hr (455 Kg/hr) in another embodiment, and greater than 10,000 lbs/hr (4540 Kg/hr) in yet another embodiment, and greater than 25,000 lbs/hr (11,300 Kg/hr) in yet another embodiment, and greater than 35,000 lbs/hr (15,900 Kg/hr) in yet another embodiment, and greater than 50,000 lbs/hr (22,700 Kg/hr) in yet another embodiment, and from 65,000 lbs/hr (29,000 Kg/hr) to 100,000 lbs/hr (45,500 Kg/hr) in yet another embodiment.

A slurry or gas phase process can be operated in the presence of a bulky ligand metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc and the like. By "essentially free", it is meant that these compounds are not deliberately added to the reactor or any reactor components, and if present, are present to less than 1 ppm in the reactor.

One or all of the catalysts can be combined with up to 10 wt % of a metal-fatty acid compound, such as, for example, an aluminum stearate, based upon the weight of the catalyst system (or its components), such as disclosed in U.S. Pat. Nos. 6,300,436 and 5,283,278. Other suitable metals include other Group 2 ard Group 5–13 metals. In an alternate embodiment, a solution of the metal-fatty acid compound is fed into the reactor. In yet another embodiment, the metal-fatty acid compound is mixed with the catalyst and fed into the reactor separately. These agents may be mixed with the catalyst or may be fed into the reactor in a solution or a slurry with or without the catalyst system or its components.

Supported catalyst(s) can be combined with the activators and are combined, such as by tumbling and other suitable means, with up to 2.5 wt % (by weight of the catalyst composition) of an antistatic agent, such as an ethoxylated or methoxylated anine, an example of which is Kemamine AS-990 (ICI Specialties, Bloomington Delaware).

EXAMPLES

The following examples refer to specific aspects of certain compositions described above.

Example 1

Table 1 shows various properties and processing conditions of four different film samples made from unblended compositions consisting only of Exceed™ 1018CA, a linear low density polyethylene (LLDPE) product sold by Exxon-Mobil Chemical Co., having a nominal density of 0.918 g/cc a nominal MI of 1.0 dg/min and an average LCB index (g') of greater than 0.97. In general, an LLDPE product useful herein preferably has a density ranging from 0.918 to 0.922 g/cm$^3$, an MI of 0.8 to 1.2 dg/min and an average g' greater than 0.97. Samples 1 and 2 are film samples made from Exceed 1018CA in the First Blend Study that was conducted, and the same lot of Exceed 1018CA resin was included in the blend compositions referenced in Table 2. Samples 3 and 4 are film samples made from Exceed 1018CA in the Second Blend Study that was conducted, and the same lot of Exceed 1018CA was included in the blend compositions referenced in Table 3.

TABLE 1

|  | First Blend Study | | Second Blend Study | |
| --- | --- | --- | --- | --- |
|  | Sample 1 Exceed 1018CA M02080382A | Sample 2 Exceed 1018CA M02080382A | Sample 3 Exceed 1018CA M03020349A | Sample 4 Exceed 1018CA M03020349A |
| Haze (%) | 7.13 | 7.69 | 31.5 | 28.3 |
| BLOWN FILM PROCESS | | | | |
| Extruder | 2½" Diameter, Davis-Standard Barrier Screw type II | | 2½" Diameter, Barrier screw with variable under cut (0.82–0.045") | |
| Extruder Temp (F.) | 310/350/350/350 | | 310/410/370/335/335 | |
| Die | 6" Diameter, Spiral | | 6" Diameter, Spiral | |
| Air Ring | Gloucester; 800 Series, Model No. 6 | | FDI, SATURN-II | |
| Die Temp (F.) | 400/400/400/400 | | 390/390/400/400/400 | |
| Die Gap (mil) | 90 | 90 | 60 | 60 |
| Output (lb/hr/in die) | 8.0 | 8.0 | 10.2 | 10.0 |
| Melt Temp (F.) | 443 | 432 | 408 | 408 |
| Air Temp (F.) | 42 | 40 | 51 | 51 |
| FLH | 19 | 21 | 25 | 25 |
| BLOWN FILM PROPERTY | | | | |
| Gauge (mil) | 0.75 | 0.75 | 1.03 | 1.03 |
| MD Tear (g/mil) | 227 | 264 | 285 | 268 |
| TD Tear (g/mil) | 380 | 389 | 419 | 413 |
| Dart Impact (g/mil) | 737 | 803 | 466 | 495 |

Example 2

Table 2 describes twenty-one samples of compositions made from seven polyethylene resins blended in varying amounts with Exceed 1018CA resin, including the Haze and Dart Impact of films made from the compositions, as well as the wt % of composition having g'≦0.90.

The LD 200 product is a high pressure low density polyethylene (HP-LDPE) resin sold commercially by ExxonMobil. The LD 113 product is another high pressure low density polyethylene resin sold commercially by ExxonMobil. The DYNH-1 product is a high pressure low density polyethylene resin sold by Dow Chemical Co. The EXP product is an experimental substantially linear low density polyethylene product. HD 9856B, HDZ 222 and HD 6704 are different high density polyethylene (HDPE) grades sold for different applications by ExxonMobil.

All the film samples in Table 2 were made with same machine set-up used in making Samples 1 and 2 described in Table 1, i.e., the First Blend Study. That is, the components were dry-blended, according to the ratios specified in Table 2, and fed directly to the extruder on the blown film line (described in Table 1). The last column in Table 2 identifies the amount of the composition (in wt %) having a SLCB index less than or equal to 0.90.

The resins identified as HDZ 222, HD9856B, HYA 301, AL 55-003 and HD 7755 are high density polyethylene (HDPE) resins sold commercially by ExxonMobil for different applications. DGDA 6097 is a high density polyethylene sold by Union Carbide of Dow Chemicals.

TABLE 2

| Sample | Properties of Additive Products | | | | Amt (%) | Haze (%) | Dart Impact (g/mil) | Avg g' | wt % having SLCB Index <=0.9 |
| --- | --- | --- | --- | --- | --- | --- | --- | --- | --- |
| | Additive Product | Density (g/cc) | MI (dg/min) | Avg g' | | | | | |
| 5A | LD 200 | 0.915 | 0.75 | 0.17 | 2.5 | 2.0 | 411 | 0.917 | 4.74 |
| 5B | | | | | 5.0 | 2.2 | 311 | 0.893 | 7.11 |
| 5C | | | | | 10.0 | 3.6 | 235 | 0.820 | 16.55 |
| 6A | LD 113 | 0.919 | 2.3 | 0.374 | 2.5 | 2.3 | 363 | 0.950 | 0.59 |
| 6B | | | | | 5.0 | 2.2 | 267 | 0.938 | 2.08 |
| 6C | | | | | 10.0 | 2.1 | 199 | 0.904 | 11.4 |
| 7A | DYNH-1 | 0.919 | 2.0 | 0.404 | 2.5 | 2.5 | 347 | 0.943 | 1.81 |
| 7B | | | | | 5.0 | 2.4 | 251 | 0.948 | 1.08 |
| 7C | | | | | 10.0 | 1.7 | 211 | 0.936 | 3.98 |
| 8A | EXP | 0.920 | 1.0 | 0.969 | 12.5 | 6.5 | 403 | 0.972 | 0 |
| 8B | | | | | 25 | 6.4 | 375 | 0.961 | 0 |
| 8C | | | | | 50 | 6.0 | 261 | 0.966 | 0 |
| 9A | HD 9856B | 0.956 | 0.46 | 0.608 | 2.5 | 4.2 | 531 | 0.959 | 0.58 |
| 9B | | | | | 5.0 | 3.7 | 501 | 0.938 | 1.96 |
| 9C | | | | | 10.0 | 3.8 | 411 | 0.949 | 1.09 |
| 10A | HDZ 222 | 0.965 | 2.25 | 0.633 | 2.5 | 6.8 | 419 | 0.955 | 0 |
| 10B | | | | | 5.0 | 3.8 | 395 | 0.958 | 0.62 |
| 10C | | | | | 10.0 | 3.5 | 315 | 0.941 | 1.61 |
| 11A | HD 6704 | 0.952 | 4.5 | 0.862 | 2.5 | 7.6 | 555 | 0.973 | 0 |
| 11B | | | | | 5.0 | 7.4 | 371 | 0.974 | 0 |
| 11C | | | | | 10.0 | 8.4 | 347 | 0.967 | 0.58 |

Example 3

Table 3 describes fifteen samples of compositions made from five polyethylene resins blended in varying amounts with the same lot of Exceed 1018 used to make Samples 3 s and 4, including the Haze and Dart Impact of films made from the compositions, as well as wt % for SLCB indexes ≦90.

TABLE 3

| | Properties of Additive Products | | | | | | Properties of Blend Compositions | | | | |
| --- | --- | --- | --- | --- | --- | --- | --- | --- | --- | --- | --- |
| | Additive Product | Density (g/cc) | MI (dg/min) | Avg. g' | Amt (%) | Haze (%) | Dart Impact | Density (g/cc) | MI (dg/min) | Avg g' | wt % having SLCB index g' <= 0.9 |
| 12A | HDZ 222 | 0.965 | 2.25 | 0.60 | 2.5 | 7.3 | 256 | 0.922 | 1.1 | 0.99 | 0.43 |
| 12B | | | | | 5.0 | 7.1 | 207 | 0.922 | 1.1 | 0.98 | 0.91 |
| 12C | | | | | 10.0 | 6.6 | 166 | 0.924 | 1.2 | 0.96 | 1.00 |
| 13A | HD 9856B | 0.956 | 0.46 | 0.63 | 2.5 | 10.3 | 246 | 0.921 | 1.1 | 0.99 | 0.32 |
| 13B | | | | | 5.0 | 8.0 | 220 | 0.922 | 1.1 | 0.98 | 0.85 |
| 13C | | | | | 10.0 | 8.0 | 183 | 0.924 | 1.1 | 0.95 | 2.07 |
| 14A | HYA 301 | 0.952 | 0.24 | 1.07 | 2.5 | 24.4 | 258 | 0.921 | 1.1 | 1.00 | 0 |
| 14B | | | | | 5.0 | 20.6 | 204 | 0.922 | 1.1 | 1.01 | 0 |
| 14C | | | | | 10.0 | 14.9 | 198 | 0.923 | 1.0 | 1.00 | 0 |
| 15A | AL 55-003 | 0.955 | 0.30 | 1.03 | 2.5 | 22.6 | 232 | 0.921 | 1.1 | 1.01 | 0 |
| 15B | | | | | 5.0 | 16.8 | 190 | 0.922 | 1.0 | 0.99 | 0.38 |
| 15C | | | | | 10.0 | 13.1 | 196 | 0.923 | 1.0 | 1.02 | 0 |
| 16A | HD 7755 | 0.952 | 0.07 | 0.72 | 2.5 | 11.0 | 318 | 0.921 | 1.0 | 1.02 | 0.20 |
| 16B | | | | | 5.0 | 9.4 | 255 | 0.922 | 1.0 | 1.00 | 1.26 |
| 16C | | | | | 10.0 | 8.0 | 202 | 0.923 | 0.9 | 0.99 | 1.69 |
| 17A | DGDA 6097 | 0.950 | 0.08 | 1.02 | 2.5 | 24.7 | 239 | 0.921 | 1.0 | 1.00 | 0 |
| 17B | | | | | 5.0 | 22.5 | 212 | 0.922 | 1.0 | 1.00 | 0 |
| 17C | | | | | 10.0 | 8.7 | 182 | 0.923 | 0.9 | 0.98 | 0 |

Example 4

Tables 4 and 5 show the relative changes in Haze and Dart Impact for the films made using the blends in Tables 2 and 3 in comparison with films made using only Exceed 1018CA.

TABLE 4

Relative Improvement of Haze and Dart Impact Over Exceed 1018 Alone

| Sample | Additive Product | Amt (%) | Haze (%) | Haze Diff (%) Vs. 1 & 2 Avg. | Dart Impact | Dart Diff (%) vs. 1 & 2 Avg. |
|---|---|---|---|---|---|---|
| 1 | Exceed 1018CA | 100 | 7.13 | | 737 | |
| 2 | Exceed 1018CA | 100 | 7.69 | | 803 | |
| 1 & 2 (Avg.) | | | 7.41 | | 770 | |
| 5A | LD 200 | 2.5 | 2.0 | −73 | 411 | −47 |
| 5B | | 5.0 | 2.2 | −70 | 311 | −60 |
| 5C | | 10.0 | 3.6 | −51 | 235 | −70 |
| 6A | LD 113 | 2.5 | 2.3 | −69 | 363 | −53 |
| 6B | | 5.0 | 2.2 | −70 | 267 | −65 |
| 6C | | 10.0 | 2.1 | −72 | 199 | −74 |
| 7A | DYNH-1 | 2.5 | 2.5 | −66 | 347 | −55 |
| 7B | | 5.0 | 2.4 | −68 | 251 | −67 |
| 7C | | 10.0 | 1.7 | −77 | 211 | −73 |
| 8A | ECD-900 | 12.5 | 6.5 | −12 | 403 | −48 |
| 8B | | 25 | 6.4 | −14 | 375 | −51 |
| 8C | | 50 | 6.0 | −19 | 261 | −66 |
| 9A | HD 9856B | 2.5 | 4.2 | −43 | 531 | −31 |
| 9B | | 5.0 | 3.7 | −50 | 501 | −35 |
| 9C | | 10.0 | 3.8 | −49 | 411 | −47 |
| 10A | HDZ 222 | 2.5 | 6.8 | −8 | 419 | −46 |
| 10B | | 5.0 | 3.8 | −49 | 395 | −49 |
| 10C | | 10.0 | 3.5 | −53 | 315 | −59 |
| 11A | HD 6704 | 2.5 | 7.6 | 3 | 555 | −28 |
| 11B | | 5.0 | 7.4 | 0 | 391 | −52 |
| 11C | | 10.0 | 8.4 | 13 | 347 | −55 |

TABLE 5

Relative Improvement of Haze and Dart Impact Over Exceed 1018 Alone

| Sample | Additive Product | Amt (%) | Haze (%) | Haze Diff (%) Vs. 3 & 4 Avg. | Dart Impact | Dart Diff (%) vs. 3 & 4 Avg. |
|---|---|---|---|---|---|---|
| 3 | Exceed 1018CA | 100 | 31.5 | | 466 | |
| 4 | Exceed 1018CA | 100 | 28.3 | | 495 | |
| 3 & 4 Avg. | | | 29.9 | | 408 | |
| 12A | HDZ 222 | 2.5 | 7.3 | −76 | 256 | −47 |
| 12B | | 5.0 | 7.1 | −76 | 207 | −57 |
| 12C | | 10.0 | 6.6 | −78 | 166 | −65 |
| 13A | HD 9856B | 2.5 | 10.3 | −66 | 246 | −49 |
| 13B | | 5.0 | 8.0 | −73 | 220 | −54 |
| 13C | | 10.0 | 8.0 | −73 | 183 | −62 |
| 14A | HYA 301 | 2.5 | 24.4 | −18 | 258 | −46 |
| 14B | | 5.0 | 20.6 | −31 | 204 | −58 |
| 14C | | 10.0 | 14.9 | −50 | 198 | −59 |
| 15A | AL 55-003 | 2.5 | 22.6 | −24 | 232 | −52 |
| 15B | | 5.0 | 16.8 | −44 | 190 | −60 |
| 15C | | 10.0 | 13.1 | −56 | 196 | −59 |
| 16A | HD 7755 | 2.5 | 11.0 | −63 | 318 | −34 |
| 16B | | 5.0 | 9.4 | −69 | 255 | −47 |
| 16C | | 10.0 | 8.0 | −73 | 202 | −58 |
| 17A | DGDA 6097 | 2.5 | 24.7 | −17 | 239 | −50 |
| 17B | | 5.0 | 22.5 | −25 | 212 | −56 |
| 17C | | 10.0 | 8.7 | −71 | 182 | −62 |

Example 5

As demonstrated in FIG. 1, certain compositions experienced a surprisingly sudden decrease or dip in the average slice value in certain regions along the molecular weight axis. Those compositions had low Haze levels while still retaining high Dart Impact levels.

What is claimed is:

1. A low density substantially linear polyethylene composition having: (a) a density of 0.935 g/cc or less; (b) a Haze of 10% or less, (c) a Dart Impact of 100 grams/mil or more, (d) an average long chain branching index of 0.95 or more; and (e) a slice long chain branching index of 0.85 or less for any portion of the composition having a molecular weight of 100,000 or above.

2. A low density substantially linear polyethylene composition having: (a) a density of 0.935 g/cc or less; (b) a Haze of 10% or less, (c) a Dart Impact of 100 grams/mil or more; and (d) an average long chain branching index of 0.95 or more; wherein: (e) a first portion of molecules has a slice long chain branching index of more than 0.90, the first portion representing 95.0 wt % or more of the composition; and (f) a second portion of molecules has a long chain branching index of 0.90 or less, the second portion representing greater than 0.2 wt % and less than 5.0 wt % of the composition.

3. A low density substantially linear polyethylene composition having: (a) a density of 0.935 g/cc or less; (b) a Haze of 10% or less, (c) a Dart Impact of 100 grams/mil or more; and (d) an average long chain branching index of 0.95 or more for the composition; wherein: (e) the composition comprises a blend of a first polyethylene component and a second polyethylene component; (f) the second polyethylene component is present in an amount of less than 10 wt %; and (g) the average long chain branching index of the second polyethylene component is less than 0.85.

4. The composition of claims 1 or 2, in which the slice long chain branching index is 0.80 or less for any portion of the composition having a molecular weight of 100,000 or above.

5. The composition of claims 1 or 2, in which the slice long chain branching index is 0.80 or less for any portion of the composition having a molecular weight of 150,000 or above.

6. The composition of claims 1 or 2, in which the portion of the composition having a molecular weight of 100,000 or more, with a slice long chain branching index of 0.85 or less, occupies 5 wt % or less of the composition.

7. The composition of claims 1, 2, or 3, in which the density of the composition is 0.910 g/cc to 0.935 g/cc.

8. The composition of claims 1, 2, or 3, in which the average long chain branching index of the composition is 0.96 or more.

9. The composition of claims 1, 2, or 3, in which the Haze is less than 5%.

10. The composition of claims 1, 2, or 3, in which the Dart Impact is 250 grams/mil or more.

11. The composition of claims 1, 2, or 3, having a polydispersity index (PDI) of from 2 to 7.

12. The composition of claims 1, 2, or 3, having an Elmendorf Tear (MD) of at least about 100 grams/mil.

13. The composition of claims 1, 2, or 3, having an Elmendorf Tear (TD) of at least about 100 grams/mil.

14. The composition of claims 1, 2, or 3, having a tensile strength (MD) of at least about 8500 psi.

15. The composition of claims 1, 2, or 3, having a tensile strength (TD) of at least about 5000 psi.

16. The composition of claim 2, in which the second portion of molecules represents 4.5 wt % or less of the composition.

17. The composition of claim 2, in which the second portion of molecules has a slice long chain branching index or 0.85 or less.

18. The composition of claim 3 in which the second polyethylene component is a polyethylene that occupies less than 5 wt % of the composition.

19. The composition of claim 3 in which the second polyethylene component includes a high density polyethylene having a density of 0.945 g/cc or more.

20. The composition of claim 3 in which the second polyethylene component includes a high pressure linear low density polyethylene having a density of 0.935 g/cc or less.

21. The composition of claim 3 in which the first polyethylene component includes a polyethylene with an average long chain branching index of 0.96 or more.

22. The composition of claim 3 in which the second polyethylene component includes a polyethylene with an average long chain branching index of 0.80 or less.

23. The composition of claim 3 in which the polydispersity (PDI) of the first polyethylene component is from 2 to 7.

24. The composition of claim 3 in which the polydispersity (PDI) of the second polyethylene component is from 5 to 25.

* * * * *